United States Patent [19]
Jancic et al.

[11] Patent Number: 5,338,519
[45] Date of Patent: Aug. 16, 1994

[54] PROCESS AND APPARATUS FOR SEPARATING SUBSTANCES BY CRYSTALLIZATION

[75] Inventors: Slobodan Jancic, Lugano; Evangelos Sakellariou, Zurich, both of Switzerland

[73] Assignee: Sulzer Brothers Limited, Winterthur, Switzerland

[21] Appl. No.: 36,322

[22] Filed: Mar. 24, 1993

Related U.S. Application Data

[62] Division of Ser. No. 805,325, Dec. 10, 1991, Pat. No. 5,230,769.

[30] Foreign Application Priority Data

Dec. 21, 1990 [CH] Switzerland .................. 04109/90

[51] Int. Cl.$^5$ .............................................. B01D 9/04
[52] U.S. Cl. ........................... 422/253; 23/295 R; 23/308 R; 422/252; 422/251
[58] Field of Search ............. 23/295 R, 296, 299, 23/308 R; 156/600, 608, 624, DIG. 113; 422/251, 252

[56] References Cited

U.S. PATENT DOCUMENTS

| | | | |
|---|---|---|---|
| 2,620,263 | 12/1952 | Macklin | 23/296 |
| 3,375,082 | 3/1968 | Graf | 422/251 |
| 3,428,437 | 2/1969 | Anderson | 23/301 |
| 3,933,573 | 1/1976 | Dugger | 156/624 |
| 3,962,082 | 6/1976 | Handal | 210/71 |
| 4,481,169 | 11/1984 | Van der Malen | 422/251 |
| 4,597,768 | 7/1986 | Thijssen et al. | 422/251 |
| 4,893,792 | 1/1990 | Nemoto et al. | 266/227 |
| 5,230,769 | 7/1993 | Jancic et al. | 156/619.1 |

Primary Examiner—R. Bruce Breneman
Assistant Examiner—Felisa Garrett
Attorney, Agent, or Firm—Francis C. Hand

[57] ABSTRACT

A process is provided for the separation of substances by melt crystallization. The organic mixtures which are difficult to crystallize are heated to a temperature sufficient to obtain a melt with the melt then being moved through a three-dimensional crystallization matrix having a large specific area. The melt is slowly cooled over a temperature range so as to achieve a selective crystallization from the supersaturated melt in the carrier matrix. A deposited crystal phase is thereafter melted and separated from the carrier matrix and removed by centrifugation. The carrier matrix may have a crystallization-promoting microstructure surface and may consist of an openpored foam.

13 Claims, 7 Drawing Sheets

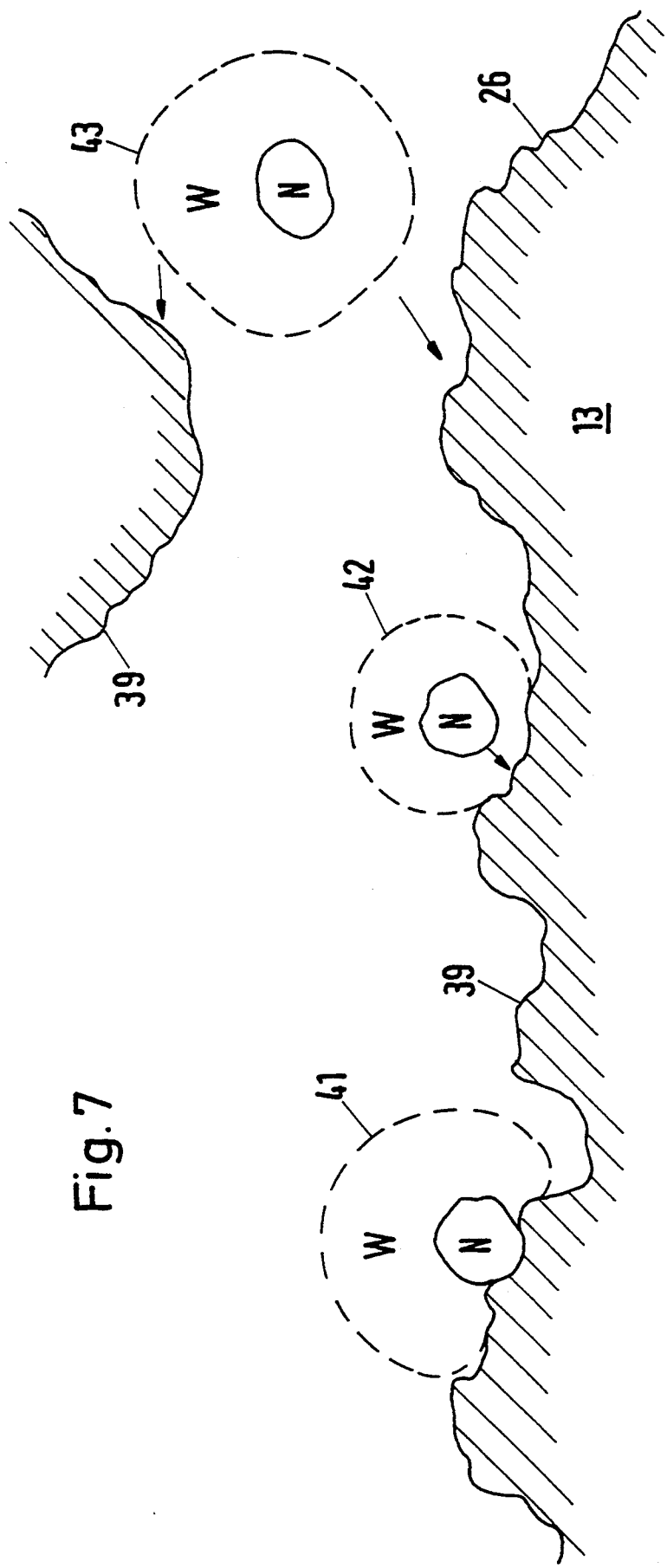

PROCESS AND APPARATUS FOR SEPARATING SUBSTANCES BY CRYSTALLIZATION

This is a division of application Ser. No. 07/805,325 filed Dec. 10, 1991, now U.S. Pat. No. 5,230,769.

This invention relates to a process and apparatus for separating substances by crystallization. More particularly, this invention relates to a process and apparatus for separating a mixture containing flexible C-H chains.

Heretofore, various types of techniques have been used for separating substances by means of crystallization of difficult-to-crystallize mixtures of flexible C-H chains, such as fatty acids, triglycerides, fat alcohols, vitamins, paraffins and/or waxes. Mixtures of this kind which are difficult to separate have hitherto usually had solvents added in a high excess to enable different fractions with a narrow melting point range to be separated. In a process according to Swiss patent 621 262, the solution is pumped cyclically with continuous cooling through filter trays of a separating column, crystals forming in the solution and being separated at the filter trays and being washed out with hot solvent after a fraction has been separated.

These known methods have considerable disadvantages however. They are complex, expensive in operation, require a considerable excess of solvents, and hence large and complicated crystallization apparatus. Also, the use of solvents means a risk of explosion and in many cases, e.g., foods, solvents are quite impermissible.

Accordingly, it is an object of this invention to provide a process and crystallization apparatus to provide an economic and efficient fractionation of mixtures which are difficult to crystallize without the use of solvents.

It is another object of the invention to be able to separate substances from mixtures containing C-H chains in a readily controlled manner.

Briefly, the invention provides a process for separating a substance from a mixture of substances by crystallization. The process includes the steps of delivering a mixture of substances containing flexible C-H chains into a three-dimensional crystallization matrix of large specific area and heating the mixture within the matrix to a temperature above the melting point of the mixture in order to form a melt. Thereafter the melt is cooled while passing through the matrix in order to effect a selective crystallization of at least one of the substances from the melt as a crystal phase onto the surfaces of the matrix. At the same time, the matrix is rotated in order to remove the remaining melt from the matrix under centrifugal force. Thereafter, the crystal phase of the crystallized substance is heated on the matrix in order to melt the phase. The matrix is then rotated in order to remove the melted phase from the matrix under centrifugal force.

Efficient selective crystallization from the melt takes place on the large surface of the three-dimensional crystallization matrix. Centrifugation enables the remaining melt, first of all, and then the molten phase, to be easily and effectively separated and discharged.

Advantageous developments of the process may include electromagnetic irradiation, preferably in a microwave frequence range between 0.5 and 50 GHz, as a particularly effective heating-up method. Suitable heating-up, however, can be effected by passing a hot medium, such as water or air, which is immiscible with the mixture through the mixture. Heating-up car also be carried out by passing through the substance mixture hot fractions of the mixture itself, such as fractions being no less pure than the phase for melting. To increase the purity of a fraction, a sweating phase can be applied before the melting operation, in which brief re-heating causes material near the surface to melt, which is removed by centrifugation.

Depending on the intended purpose, the process can be performed in various ways. To obtain a certain fraction, the melt can be continuously cyclically moved through the carrier matrix during a cooling phase. To separate a plurality of fractions, the mixture can also be consecutively treated in a plurality of stages over a cooling zone in each, a fraction crystallizing out in each stage, the cooling zones having decreasing initial temperatures. Alternatively, the mixture can pass through each stage just once in continuous operation, then be introduced into the next stage and be removed after the last stage or be returned to the first stage. One stage, in each case, can be alternately bridged for the purpose of melting and discharging the crystalline phase deposited therein. Depending on the mixture of substances the cooling zones can also overlap slightly.

The invention also provides a crystallizer which is constructed of a housing, a three-dimensional crystallization carrier matrix of large specific area in the housing, a rotatable shaft fixed to the matrix for rotating the matrix in the housing and a motor for rotating the shaft. In addition, the crystallizer includes a heating means for melting a mixture of substances containing the flexible C-H chains in the housing into a flowable melt, a conveyor means for conveying the melt through the matrix and a temperature control means for controlling the temperature of the melt.

Advantageously, the heating means may be in the form of a microwave generator with microwave windows radiating into the interior and with a weakly-absorbent carrier matrix. To promote crystallization, the carrier matrix may have a microstructured surface of large specific area, preferably between 2000 and 10000 $m^2/m^3$. To facilitate the discharge on centrifugation, the structure of the carrier matrix may be radially open.

Advantageous variants of the carrier matrix may consist of an open-pored foam having an average pore size of from 0.3 to 3 millimeters (m m). The carrier matrix may also consist of needle felt fixed on a carrying structure to give the necessary strength to centrifugal forces.

Suitable materials for the carrier matrix are inert ceramic substances, such as aluminum oxide, glass or organic polymers.

To optimize and simplify operation, the crystallizer may have a control and regulating unit comprising temperature sensors and a programming stage.

A plant may consist of a plurality of crystallizers which, depending upon the application, may be operated optionally connected in parallel and in series.

These and other objects and advantages will become more apparent from the following detailed description taken in conjunction with the accompanying drawings wherein:

BRIEF DESCRIPTION OF THE DRAWINGS

FIG. 7 illustrates the principle of selective crystallization according to the invention in the carrier matrix.

Referring to FIG. 1, the crystallizer 10 includes an interior chamber 11 within a surrounding housing 12 and in which a crystallization carrier matrix 13 is rotatably mounted via a rotary shaft 14. The shaft 14 is driven by an external motor 16. A spigot 15 is provided to deliver a substance mixture into the chamber 11 while a heating device 19 is provided adjacent the chamber 11 to heat and melt the substance mixture. This heating device 19 is in the form of a microwave generator 23 with windows 24 into the interior chamber 11.

Figure 1:
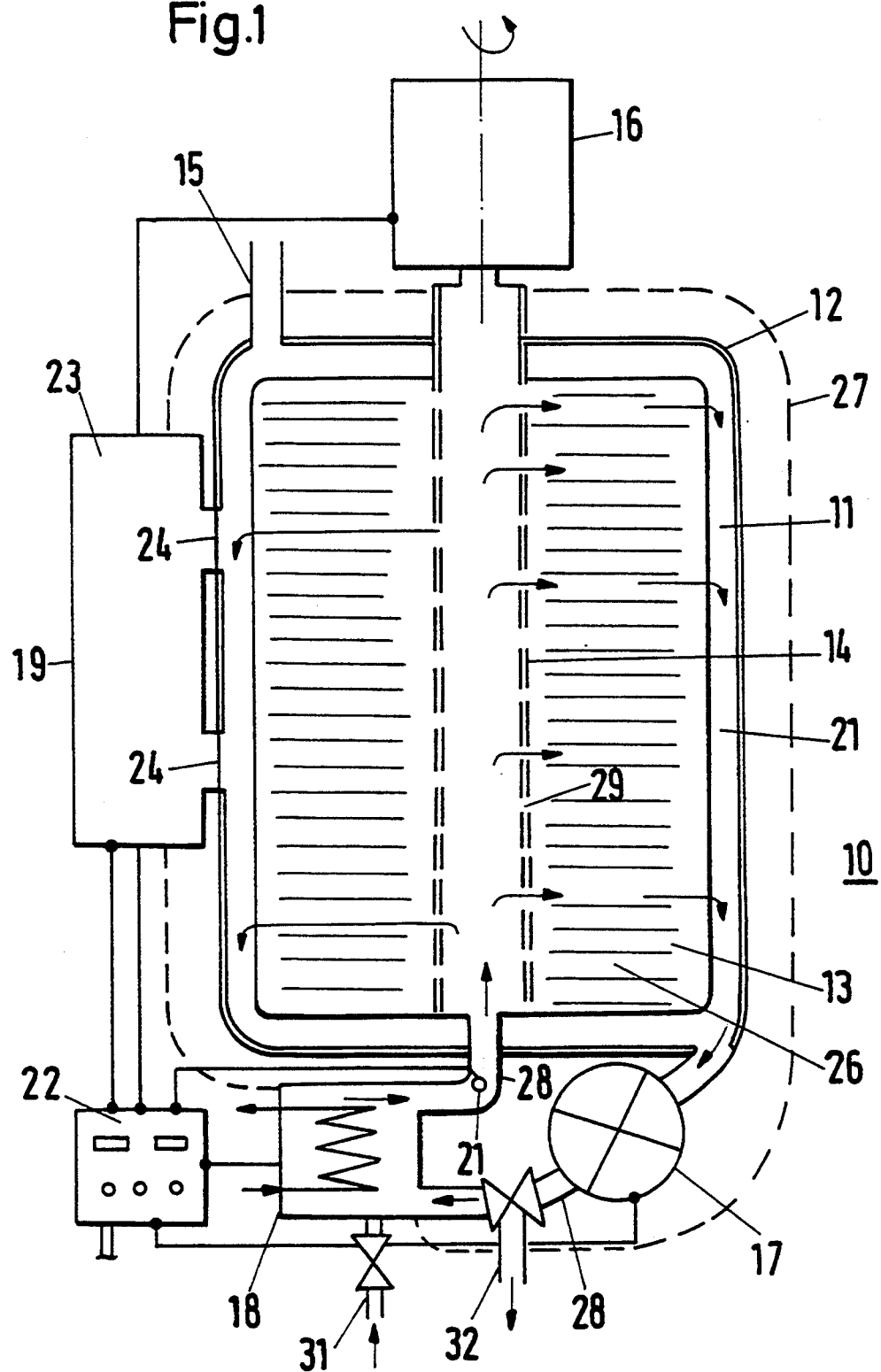
FIG. 1 illustrates a cross-sectional view of a crystallizer constructed in accordance with the invention.

The mixture which is delivered to the chamber 11 may be an organic mixture of C-H chains, such as fatty acids, triglycerides, fat alcohols, vitamins, paraffins and/or waxes.

The rotary shaft 14 is hollow and is provided with apertures 29 to move the melt cyclically through the carrier matrix 13 and, via connecting lines 28, into a temperature control device 18. The speed of delivery of the melt in this cycle and, in particular, the flow speed which influences the crystallization process in the carrier matrix 13, is set by a delivery means 17, e.g., a pump. The rotating carrier matrix 13 also operates the centrifugal pump, so that melt circulation is also produced as a result. However, the speed of flow in the carrier matrix 13 can be varied and optimized independently of the speed of rotation of the matrix, by means of an additional separately controllable pump. Thus, depending on the substance mixture, structure of the carrier matrix 13 and type of operation, it is possible to ascertain and set optimal selective crystallization conditions. The temperature control device 18 correspondingly produces a required optimal temperature curve in a cooling zone, i.e., a slow fall of the melt temperature controlled by temperature sensors 21 in the connecting line 28 and chamber 11 during the circulation through the carrier matrix 13.

An insulating cover 27 provides maximum homogeneity in the temperature distribution in the melt.

A control and regulating unit 22 is connected to the motor 16, delivery push 17, temperature control device 18, heating device 19 and sensors 21 to allow any crystallization processes to be optimized, monitored and automatically operated. To this end, the control unit 22 may contain a programing stage and allow two-way communication between the operator and the process sequence.

The temperature control device 18, e.g., in the form of a heat exchanger, can act as a heating or cooling means, depending on the type of operation, to give the required temperature profile for the melt. Introduction of the substance mixture may also be via an inlet 31 to the temperature device 18. The substance is discharged or fed to another crystallization stage via an outlet 32.

Figure 2A:
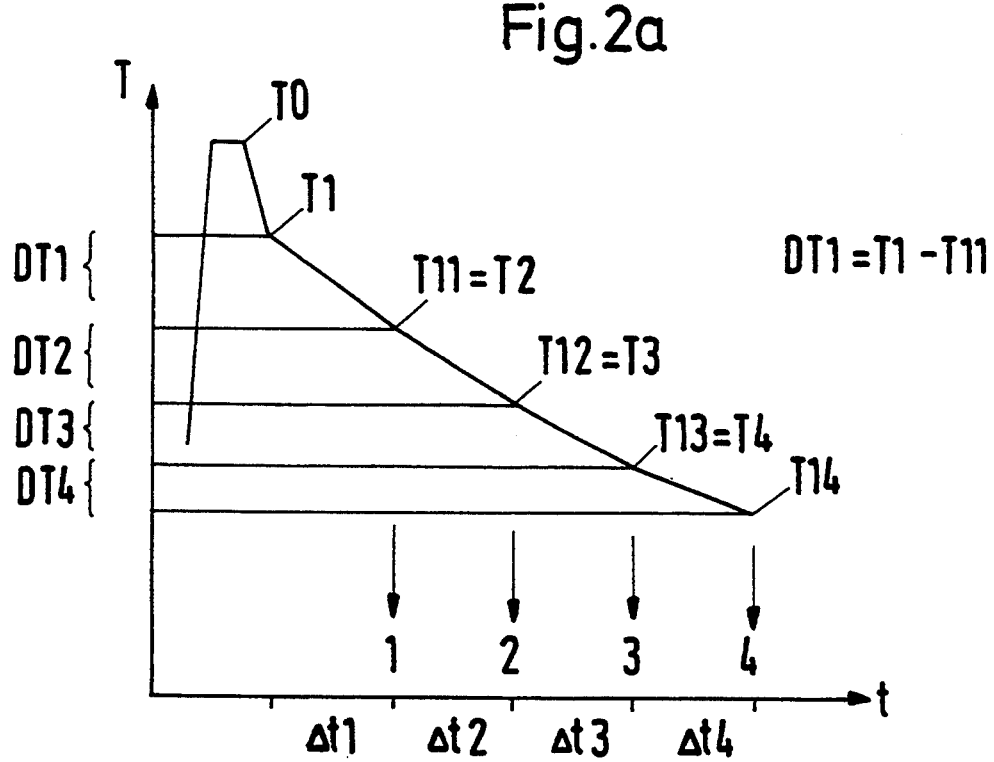
FIG. 2a graphically illustrates the temperature curves per unit of time for various cooling stages of the crystallizer of FIG. 1.

FIG. 2a shows examples of possible temperature curves per unit of time with the process according to the invention over a number of cooling zones DT1 to DT4. A given substance mixture, e.g., palm oil, is first heated to a temperature TO situated so far above the melting point that all the aggregates are completely separated. After relatively rapid lowering to the initial temperature T1 of the first stage at which crystallization of the hardest fraction starts, there is a decelerated cooling over the first cooling zone DT1 to the end temperature T11 with continual flow through the crystallization carrier matrix 13 and continuous deposition of the first crystal phase 1 on the carrier matrix. The remaining melt is then removed from the carrier matrix and discharged by centrifugation. After a possible sweating phase, which is also centrifuged off, the remaining phase 1 on the carrier matrix is again heated, melted and separated from the matrix and discharged again by centrifugation. The remaining melt is then crystallized out on the carrier matrix over the second cooling zone DT2 from the initial temperature T2 to the end temperature T12 and this second crystal phase 2 is similarly separated and discharged. Other stages follow similarly over the cooling zones DT3 and DT4 with the resultant crystal phases 3 and 4.

Figure 2B:
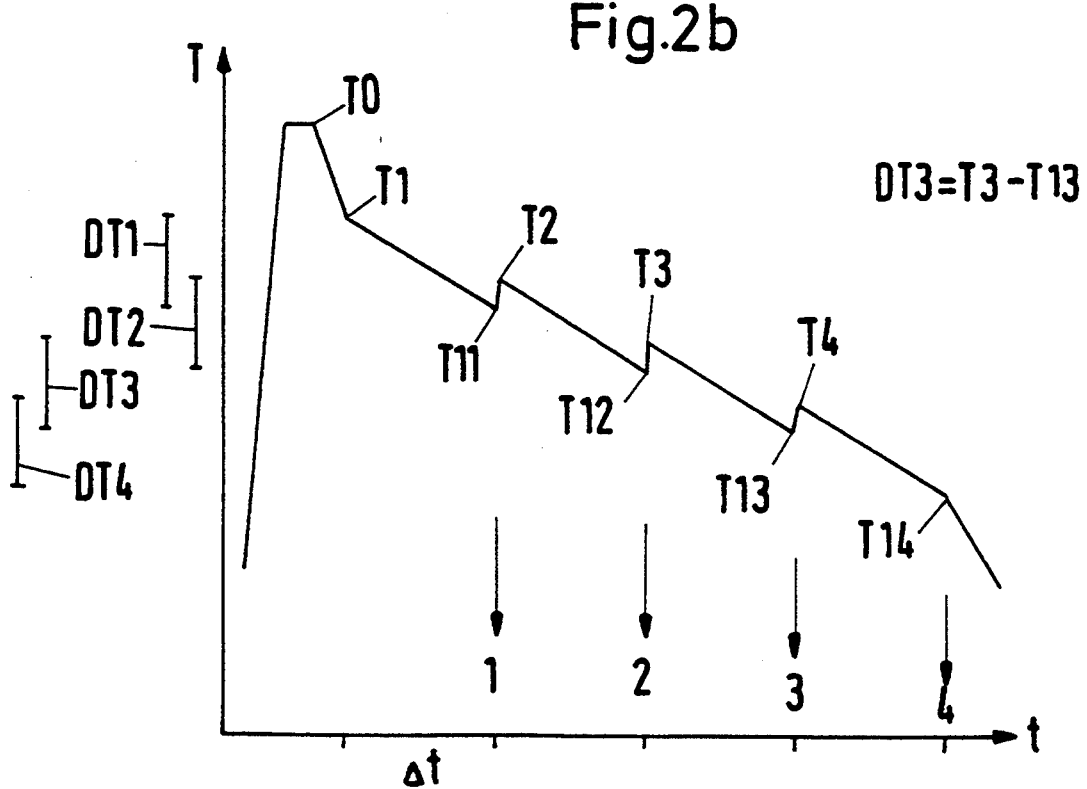
FIG. 2b graphically illustrates overlapping cooling zones in accordance with the invention.

According to FIG. 2b, the cooling zones DT1 to DT4 can also overlap, i.e., so that the initial temperatures T2, T3, T4 of the following stages are made higher than the end temperatures T11, T12, T13 of the preceding stages.

Figure 3A:
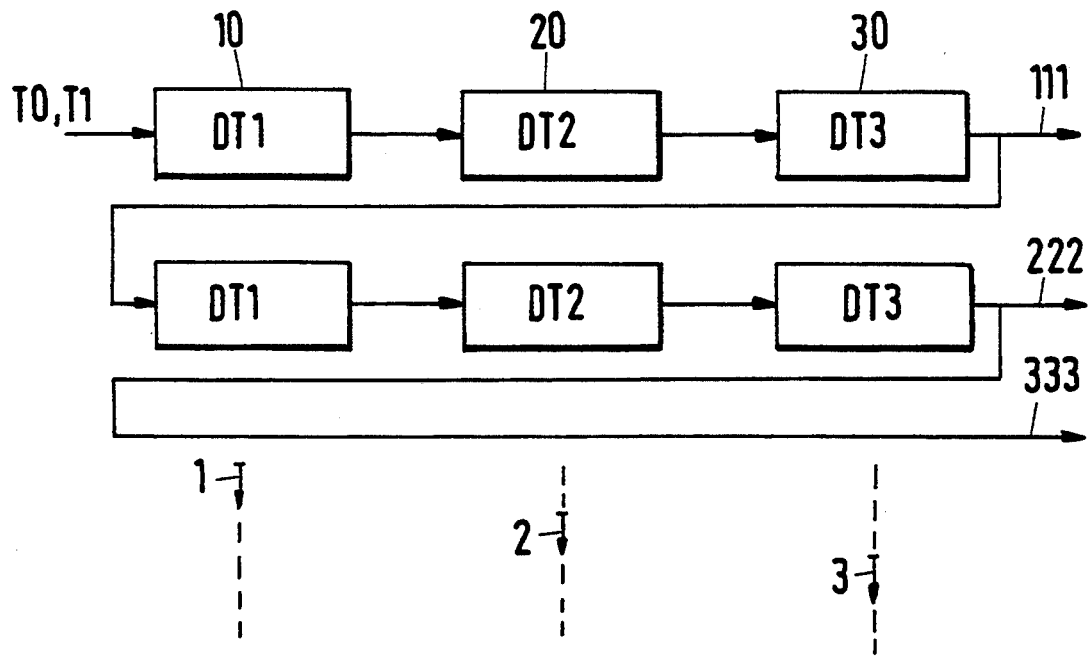
FIG. 3a illustrates a series arrangement of crystallizers in accordance with the invention.

According to FIG. 3, different types of operation are possible as shown diagrammatically with three crystallizers, 10, 20, 30. In the continuous operation shown in FIG. 3a, after once passing through the carrier matrix in the first stage DT1 in the crystallizer 10, the melt is immediately passed to the second stage DT2 in the crystallizer 20 and then to the third stage DT3 of crystallizer 30. The remaining melt can then either be discharged 111 or be reheated for another pass and be fed into the first stage DT1 of crystallizer 10. The remaining melt can finally be discharged after two passes 222 or three passes 333. The phases 1, 2, 3 can then be melted in the crystallizers 10, 20, 30 as described and be centrifuged off.

Figure 3B:
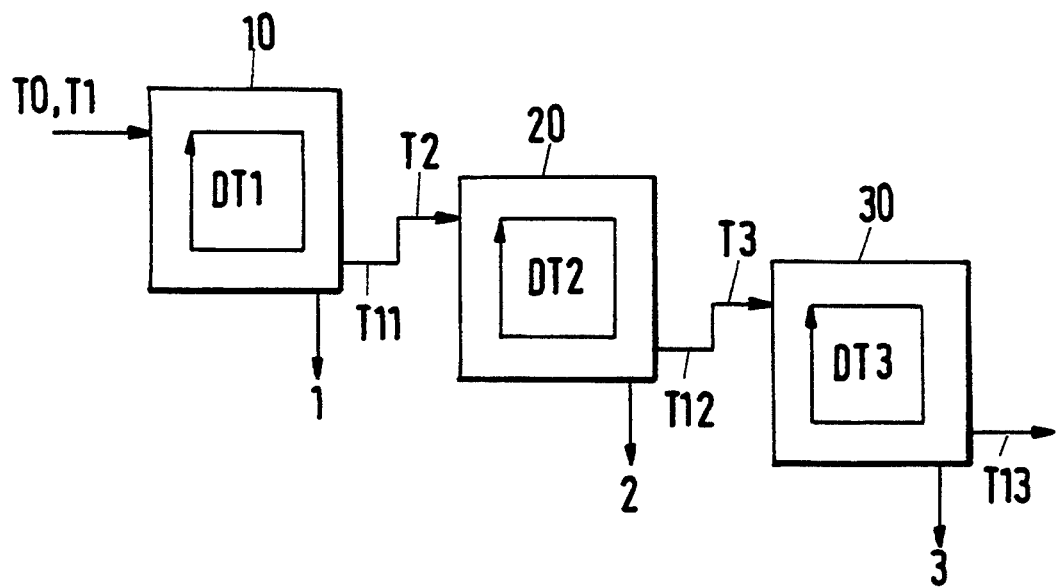
FIG. 3b diagrammatically illustrates a batch process utilizing three crystallizers in accordance with the invention.

FIG. 3b is a diagram showing a batch process in which the stages DT1, DT2 and DT3 are run discontinuously in succession. In each cooling stage, the melt is cyclically moved repeatedly through the carrier matrix 13 and the remaining melt is transferred to the second stage DT2 of crystallizer 20 only after substantially complete crystallization out of the corresponding fraction 1. The second fraction or phase 2 is completely crystallized out in the second crystallizer 20 and the remaining melt is again only then transferred to the third stage. This discontinuous process can also be performed with just one crystallizer 10 if, on completion of each cooling stag DT1, DT2, the remaining melt is intermediately stored in a storage container until the deposited crystal phase 1, 2 has been removed from the carrier matrix 13 and discharged.

Figure 4A:
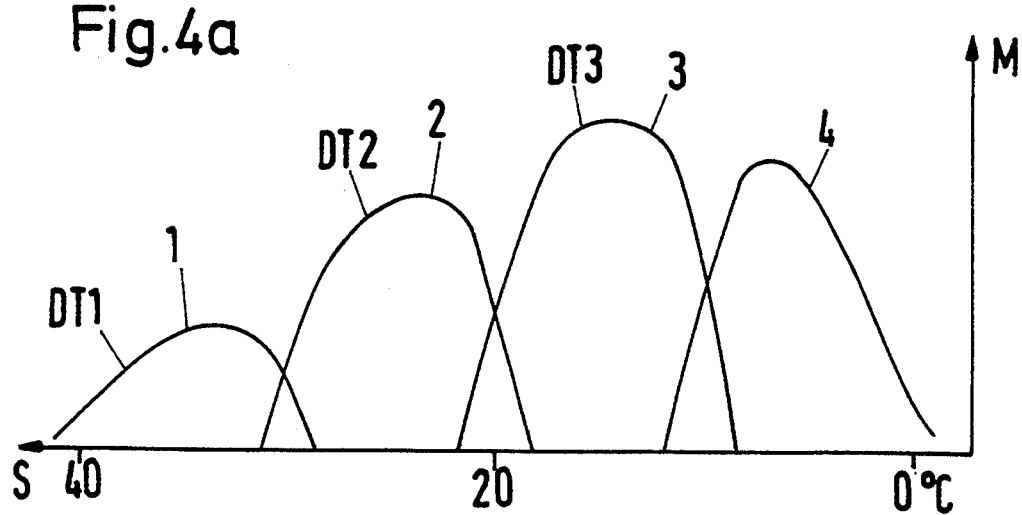
FIG. 4a graphically illustrates a quantitative distribution of crystal fractions produced in accordance with the invention using a batch operation as in FIG. 3b.
Figure 4B:
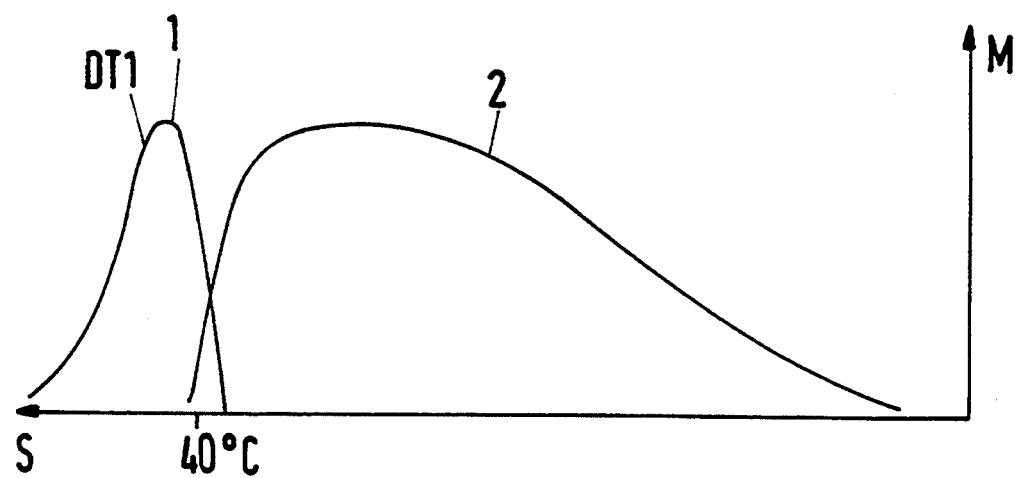
FIG. 4b illustrates a quantitative distribution of crystals using a batch process as in FIG. 3b.
Figure 4C:
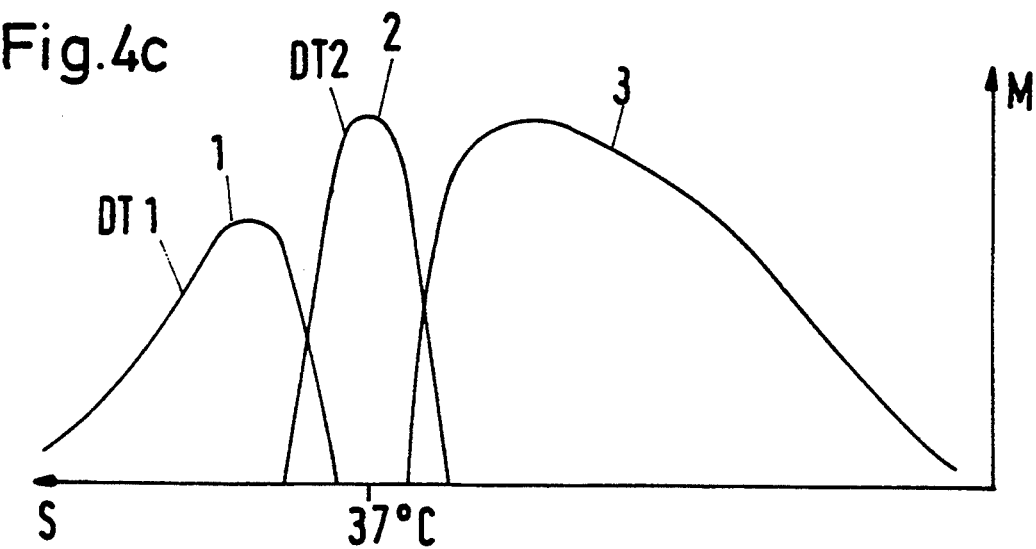
FIG. 4c illustrates a further quantitative distribution of crystal phases which can be obtained in accordance with the invention.

FIG. 4 shows examples of the quantitative distribution of crystal fractions produced in accordance with the invention by different types of operation. The quantitative distribution M are shown against the melting point S for the different fractions. In FIG. 4a, a substance mixture consisting, for example, of natural triglycerides was crystallized out successively in batch operation (as in FIG. 3b) with four cooling zones DT1 and DT4. The four crystal fractions 1, 2, 3 and 4 are thus separated with corresponding melt point zones: a hard fraction, middle fractions 2 and 3 and an oil fraction 4. Depending on the application, however, as shown in FIG. 4b, for example, there may be just one hard top fraction 1 with a high melting point wanted, and this is separated from the residue 2, i.e., the entire melting point zone therebeneath. As a component in foods, for example, as shown in FIG. 4c, a narrow middle fraction 2 around 37°, consisting of coconut oil corresponding to the human body temperature, may be required, which produces a delicately melting taste. In this case, the broad upper fraction 1 is first separated, and then the narrow middle fraction 2 is crystallized out and separated from the residue 3.

Figure 5A:
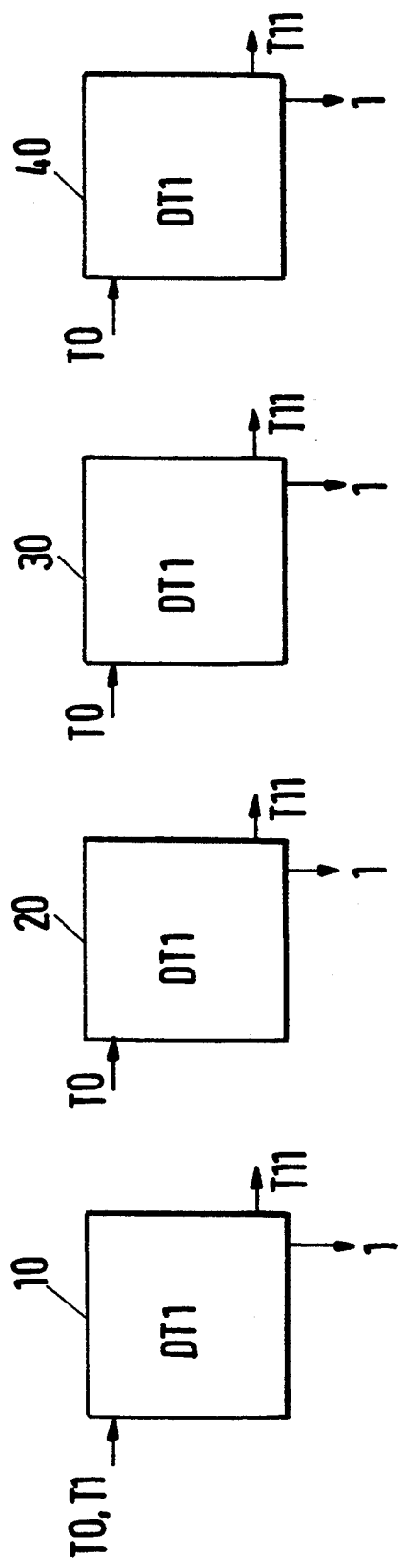
FIG. 5a illustrates an installation comprised of a plurality of crystallizers which can be operated in a series or parallel in accordance with the invention.
Figure 5B:
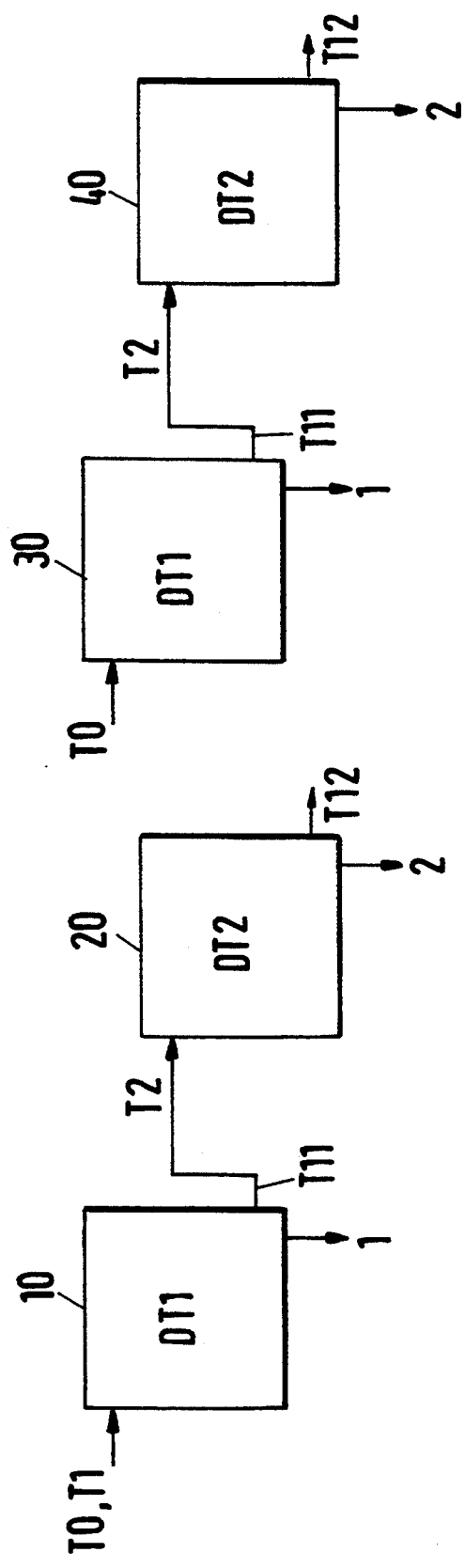
FIG. 5b illustrates pairs of series-connected crystallizers operated in parallel manner in accordance with the invention.

According to FIG. 5, an installation may consist of a plurality of crystallizers 10, 20, 30, 40 according to the invention, which can be operated in series, in parallel or combined. In order, for example, to obtain a top hard fraction 1 with a high yield (as shown in FIG. 4b), all four crystallizers are operated in parallel by the batch process over the cooling zone DT1 as shown in FIG. 5a. In FIG. 5b pairs of series-connected crystallizers 10, 20 and 30, 40 are operated in parallel in order, for example as shown in FIG. 4c, to separate a defined middle fraction 2. Of course, all four crystallizers 10-40 can be operated in series similarly to the examples of FIG. 3a and FIG. 3b.

The structure of the crystallization carrier matrix 13 is very important for the process according to the invention. On the one hand, the matrix 13 must have a crystallizationpromoting large surface with suitable microstructure and, on the other hand, have sufficiently high mechanical strength not to slip away or be compressed during centrifugation.

Figure 6A:
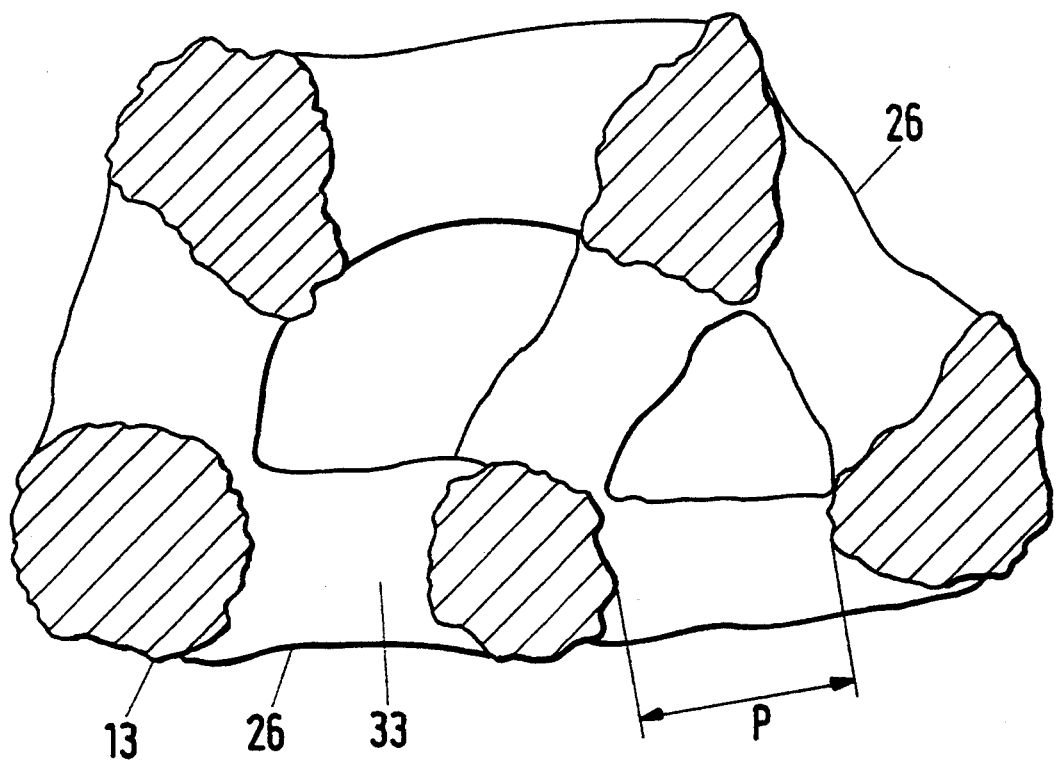
FIG. 6a illustrates a cross-section of a crystallization carrier matrix in the form of a form in accordance with the invention.

Referring to FIG. 6a, the carrier matrix may consist of an open-pored foam 33 with average pore sizes P in the range from 0.3 mm to 1 mm and with a surface 26. Structures of this kind can be made, for example, from ceramic materials such as aluminum oxide, glass or polymers. The surface 26 preferably has a microstructuring of the order of magnitude of $1/100\ \mu$ to $\mu$, this being equivalent to the size of the seed crystals so as to promote crystallization. The foam 33 also gives efficient and non-injuring fractionation of even very sensitive and difficult to separate mixtures of substances.

Figure 6B:
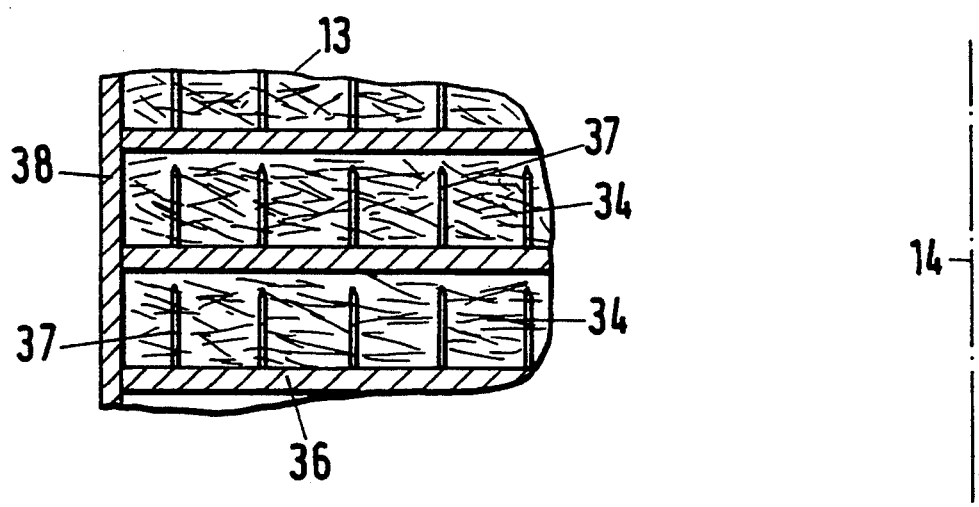
FIG. 6b illustrates a part cross-sectional view be a matrix using a needle felt in accordance with the invention.

Referring to FIG. 6b, another construction of carrier matrix 13 to rotate of the shaft 14 (represented schematically) consists of laminated needle felt discs 34 fixed on a supporting structure 36 in the form of discs provided with pins 37 similar to a nail board. An outer cage 38 gives the entire structure additional mechanical strength. The needle felt may, for example, consist of polyester or polypropylene.

FIG. 7 is a diagram of the crystallization processes in the carrier matrix, all of which are promoted and intensified by the structure and nature thereof. The following three possible crystallization variants can be distinguished:

41 seed formation of nucleation N initiated and localized at the microstructured surface 39 of the carrier matrix, the localized seed crystal N grows further in situ adjacent W.

42 seed crystals N already formed in the melt are fixed preferably at the surface 39 and again grow further adjacent there.

43 crystallites grown in the melt and not yet localized are additionally retained in the entire carrier structure in the sense of a filter effect.

Thus, depending on the substance mixture and process parameters, all three processes can take place, either intensified or rendered possible at all for the first time by the carrier matrix. This gives a maximal and economic selective crystallization and separating effect. In addition, the treatment is very gentle without superheating, this being a particularly advantageous feature for sensitive substances, such as vitamins.

The invention thus provides a relatively simple process and apparatus for obtaining fractionation of mixtures which are difficult to crystallize without the need for solvents.

The invention further provides a process which is relatively simple to perform as well as an apparatus which is relatively simple to construct.

What is claimed is:

1. A crystallizer comprising
 a housing;
 a three-dimensional crystallization carrier matrix of large specific area between 2,000 and 10,000 $m^2/m^3$ in said housing;
 a rotatable shaft fixed to said matrix for rotating said matrix in said housing;
 a motor for rotating said shaft;
 heating means for melting a mixture of substances containing flexible C-H chains in said housing into a flowable melt;
 conveyor means for conveying the melt through said matrix; and
 a temperature control means for controlling the temperature of the melt.

2. A crystallizer as set forth in claim 1 wherein said heating means comprises a microwave generator having windows for passage of microwaves into said housing, 3. A crystallizer as set forth in claim 2 wherein said carrier matrix has a lower absorption for microwaves than the mixture for processing.

4. A crystallizer as set forth in claim 13 wherein said carrier matrix has a crystallization-promoting microstructure surface.

5. A crystallizer as set forth in claim 1 wherein said carrier matrix is open in a radial direction.

6. A crystallizer as set forth in claim 1 wherein said carrier matrix is an open-pored foam.

7. A crystallizer as set forth in claim 6 wherein the average pore size of said foam is between 0.3 and 3 millimeters.

8. A crystallizer as set forth in claim 1 wherein said carrier matrix consists of a needle felt fixed on a carrying structure.

9. A crystallizer as set forth in claim 1 wherein said carrier matrix is made of a material selected from the group consisting of ceramic material, glass and organic polymers.

10. A crystallizer as set forth in claim 1 wherein said carrier matrix is made of aluminum oxide.

11. A crystallizer as set forth in claim 1 which further comprises at least one temperature sensor in a flow path of the melt in said housing and a control and regulating unit connects to said temperature sensor and said temperature control means for regulating said control means in response to a sensed temperature of the melt.

12. A crystallizer as set forth in claim 11 wherein said control unit contains a programming stage and is operatively connected to said motor and said conveyor means.

13. An installation comprising a plurality of crystallizers according to claim 1 which are operably connected in one of parallel and series.

* * * * *

UNITED STATES PATENT AND TRADEMARK OFFICE
CERTIFICATE OF CORRECTION

PATENT NO. : 5,338,519
DATED : August 16, 1994
INVENTOR(S) : SLOBODAN JANCIC, et al It is certified that error appears in the above-indentified patent and that said Letters Patent is hereby corrected as shown below:

```
Column 1, line 65 change "frequence" to -frequency-
Column 2, line 1 change "car" to -can-
Column 4, line 4 change "push" to -pump-
Column 5, line 6 change "stag" to -stage-
```

Signed and Sealed this

Twenty-fifth Day of October, 1994

Attest:

BRUCE LEHMAN

*Attesting Officer*   *Commissioner of Patents and Trademarks*